(12) United States Patent
Sellers

(10) Patent No.: US 8,913,256 B2
(45) Date of Patent: Dec. 16, 2014

(54) METHOD AND SYSTEM FOR PERFORMING AN IMAGING FUNCTION BY AN IMAGING DEVICE

(75) Inventor: Ronald Todd Sellers, Stamping Ground, KY (US)

(73) Assignee: Lexmark International, Inc., Lexington, KY (US)

( * ) Notice: Subject to any disclaimer, the term of this patent is extended or adjusted under 35 U.S.C. 154(b) by 215 days.

(21) Appl. No.: 13/072,727

(22) Filed: Mar. 27, 2011

(65) Prior Publication Data

US 2012/0243054 A1 Sep. 27, 2012

(51) Int. Cl.
G06F 3/12 (2006.01)
H04N 1/04 (2006.01)
H04N 1/40 (2006.01)
G03G 15/00 (2006.01)

(52) U.S. Cl.
USPC ............ 358/1.13; 358/448; 358/474; 399/9; 399/379; 399/380

(58) Field of Classification Search
USPC ........ 358/1.13, 498, 497, 486, 488, 474, 448; 399/9, 379, 380
See application file for complete search history.

(56) References Cited

U.S. PATENT DOCUMENTS

| | | | |
|---|---|---|---|
| 6,088,025 A * | 7/2000 | Akamine et al. | 345/175 |
| 6,466,302 B1 | 10/2002 | Rousseau et al. | |
| 7,490,824 B2 * | 2/2009 | Kakuta | 271/3.01 |
| 8,363,254 B2 * | 1/2013 | Ichikawa et al. | 358/1.15 |
| 2002/0075529 A1 | 6/2002 | Sato et al. | |
| 2004/0114786 A1 | 6/2004 | Cannon et al. | |
| 2006/0023271 A1 | 2/2006 | Boay et al. | |
| 2007/0076251 A1 | 4/2007 | Yasuda | |
| 2010/0053706 A1 * | 3/2010 | Jasinski et al. | 358/498 |
| 2010/0149147 A1 | 6/2010 | Zhang et al. | |
| 2010/0188679 A1 | 7/2010 | Nakagawa | |
| 2012/0262737 A1 | 10/2012 | Beegle et al. | |

FOREIGN PATENT DOCUMENTS

| | | |
|---|---|---|
| JP | 2006-217103 | 8/2006 |
| JP | 200627103 | 8/2006 |

OTHER PUBLICATIONS

Non-Final Office Action for U.S. Appl. No. 13/088,193, dated Sep. 30, 2013.
Final Office Action for U.S. Appl. No. 13/088,193, dated Mar. 25, 2014.
Non-final Office Action for U.S. Appl. No. 13/088,193, dated Sep. 25, 2014.

* cited by examiner

Primary Examiner — Charlotte M Baker

(57) ABSTRACT

A method for reducing time in performing an imaging function by an imaging device. The method includes receiving at least one media sheet against an image capture window of the imaging device, detecting whether a lid for covering the image capture window is closed, capturing an image of the at least one media sheet in the image capture window in response to detecting a closed lid, receiving a start signal indicative of a user request to start an image capture operation after capturing the image, and sending a final image based upon the captured image to a destination.

23 Claims, 8 Drawing Sheets

METHOD AND SYSTEM FOR PERFORMING AN IMAGING FUNCTION BY AN IMAGING DEVICE

BACKGROUND

1. Field of the Invention

The present invention relates generally to imaging and, more particularly, to an imaging device utilizing a method for reducing time spent in performing an imaging function.

2. Description of the Related Art

Scanning is a standard imaging device feature that converts a document into digital form. Typically, scanning is utilized when performing functions that require capturing of images on media sheets. Such functions may include faxing, copying, and storing electronic copies on a computer. The imaging device may incorporate a flatbed scanner or a vertical scanner having an image capture unit utilizing a scan bar or a camera.

A user accessing the imaging device for a scan operation initially lifts a scan lid, places a document face down on an imaging window, closes the scan lid, and selects a desired function/option. The imaging device normally waits for a user to select a function before it proceeds with an image capture operation. This is typically the case as the imaging device first needs to determine the user defined options so as to properly generate an output that meets the user's approval. Only after the user presses a start button or image will the imaging device perform the selected function by first obtaining an image and then processing the image based on the options indicated by the user.

The scan operation takes time in generating image data as well as in performing image processing on the acquired image. In some practices, the scan time is reduced by capturing at one time a substantially entire image of the media sheet. This may be accomplished by utilizing, for example, a camera scan type imaging device. However, since so much data is quickly generated, image processing becomes a significant portion of the total scan time. As a result, the entire operation still takes a substantially long time to complete such that users are sometimes inconveniently required to wait. Various methods have been implemented to decrease the time required to complete such tasks by increasing hardware performance. However, such measures introduce additional cost to the product. Based upon the foregoing, there is a need to effectively reduce the completion time of an imaging function without the need to increase hardware performance or incur additional cost.

SUMMARY OF THE INVENTION

Embodiments of the present disclosure provide a method that may be implemented on an imaging device to reduce the amount of time to complete a function utilizing an imaging capture operation without increasing the performance of the hardware or adding cost. According to example embodiments, an image on a media sheet may be captured after determining that a lid is closed and before receiving a start request from a user. This way, the time during which the imaging device waits for a user to select a function and initiate the start of its operation is productively utilized so that the completion time of the selected function after initiation is effectively reduced.

In an example embodiment, an imaging device includes an image capture window, a lid attached to the imaging device for covering the image capture window when closed, a controller for determining whether the lid is closed, and an image capture unit for capturing an image of at least one media sheet in the image capture window if the lid is determined to be closed. The controller receives a start signal indicative of a user request to start an image capture operation after the image capture unit captures the image and, in response, sends a final image based upon the captured image to a destination.

In another example embodiment, the imaging device may perform a set of one or more image processing operations on the captured image before receiving the start request. For example, the set of one or more image processing operations may be image processing operations that are independent of the user-specified function usually provided by the user with the start request. As a result, both image capture and image processing operations are automatically performed following lid closure, thereby taking further advantage of the time prior to the user selecting a function and submitting the start request.

BRIEF DESCRIPTION OF THE DRAWINGS

The above-mentioned and other features and advantages of the various embodiments of the invention, and the manner of attaining them, will become more apparent and will be better understood by reference to the accompanying drawings, wherein.

DETAILED DESCRIPTION

Figure 1:
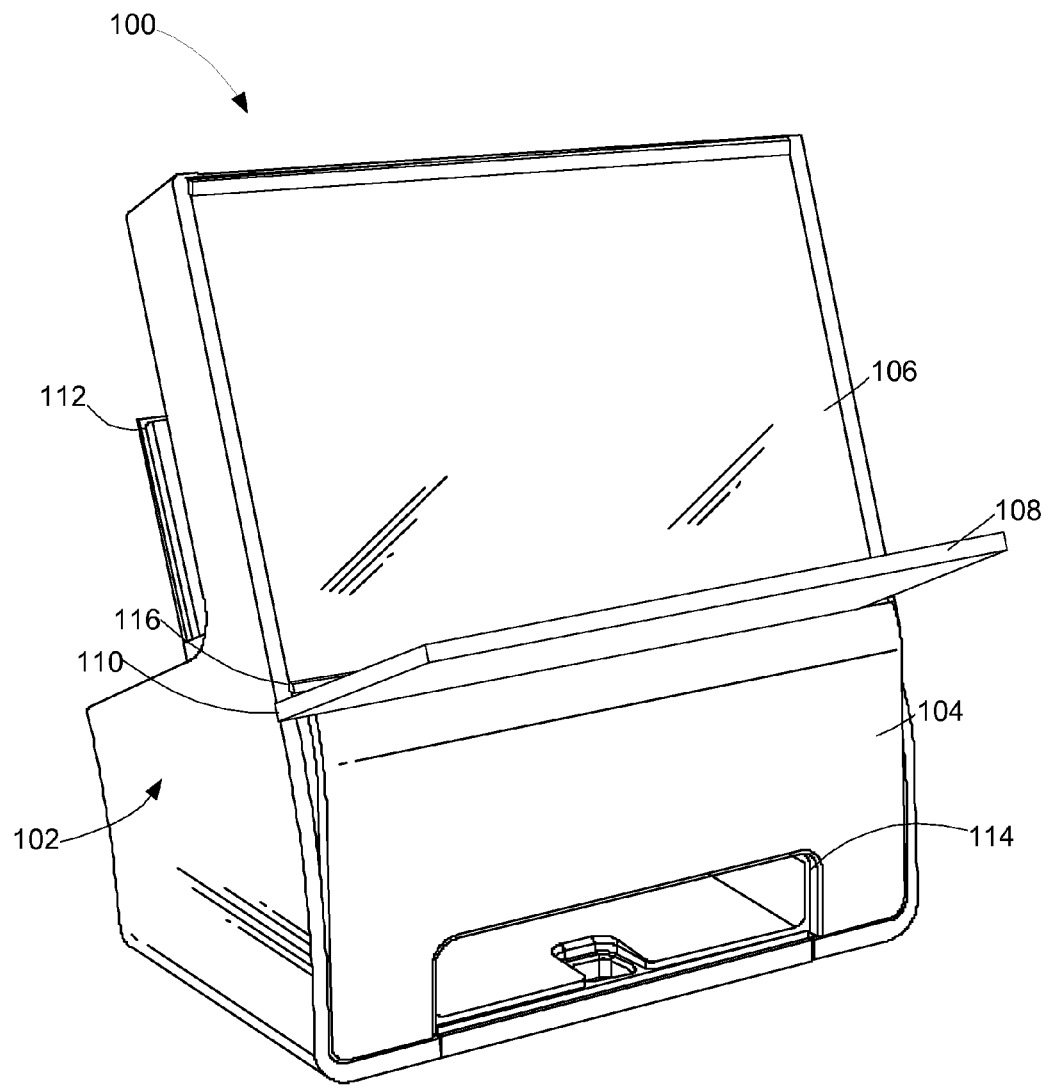
FIG. 1 is a perspective view of one embodiment of an imaging device with a scan lid in the open position.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item.

Reference will now be made in detail to the example embodiment(s), as illustrated in the accompanying drawings. Whenever possible, the same reference numerals will be used throughout the drawings to refer to the same or like parts.

FIG. 1 illustrates a perspective view of an imaging device 100 embodying an example embodiment. Imaging device 100, which may be a standalone imaging device, includes a housing 102 having a front portion 104 including an image capture window 106. Image capture window 106 may be constructed from a rigid, transparent and/or translucent material, such as glass.

As shown, imaging device 100 may include a lid 108 pivotably connected to the front portion 104 of the housing 102. The lid 108 may be pivotably connected along a bottom edge 110 thereof to the front portion 104 of the housing 102 via hinges or the like (not shown) to allow the lid 108 to swing relative to the image capture window 106 so that the lid 108 may cover the image capture window 106 in a closed position and uncover the image capture window 106 in an open position. FIG. 1 illustrates lid 108 disposed in the open position with image capture window 106 exposed. The back portion of the imaging device 100 may have an input media tray 112 that may retain one or more print media sheets therein. A media output area 114 may be positioned along a lower part of front portion 104.

According to an example embodiment, image capture window 106 may be disposed in an inclined position at an acute angle relative to the horizontal. Front portion 104 of housing 102 may also include a ledge 116 on which a sheet of media may rest when positioned against image capture window 106 when the lid is in the open position. Once the media sheet is properly positioned, the lid is closed so that image on the media sheet may be captured.

Figure 2:
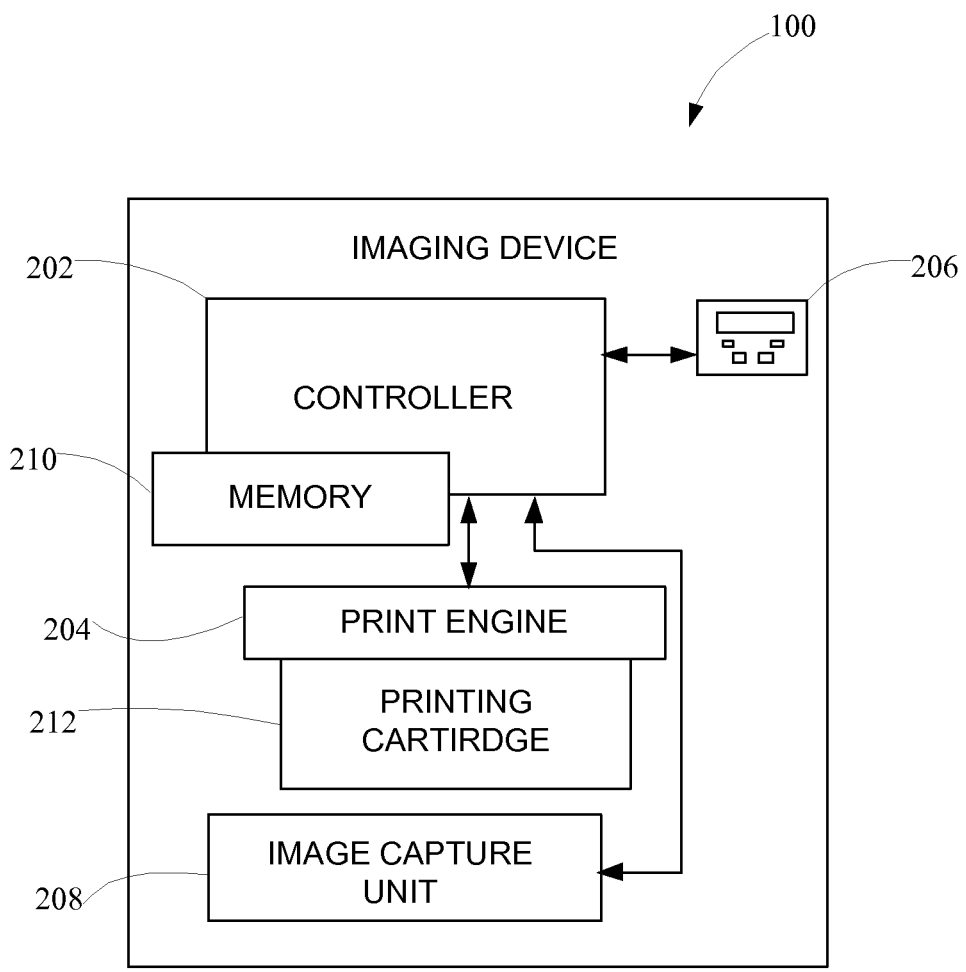
FIG. 2 is a block diagram depicting components of the imaging device in FIG. 1.

FIG. 2 is a block diagram depicting at least some of the main components of imaging device 100. Imaging device 100 may include a controller 202 communicatively coupled to a print engine 204, a user interface 206, and an image capture unit 208. Controller 202 may include a processor unit (not shown) and associated memory 210, and may be formed as one or more Application Specific Integrated Circuits (ASIC). Memory 210 may be any memory device convenient for use with controller 202. Controller 202 may be, for example, a combined printer and image capture controller.

Imaging device 100 may include one or more mechanisms (not shown) for picking a sheet of media from input media tray 112, moving the picked sheet to a location adjacent print engine 204 for printing an image thereon, and moving the picked sheet having the printed image to media output area 114. During advancement, the picked media sheet moves from the input media tray 112 to media output area 114 along a substantially L-shaped media path. However, it is understood that a C-shaped media feedpath configuration, a straight-through feedpath or other media feedpath configuration may be utilized.

Controller 202 may communicate with print engine 204. Controller 202 may serve to process print data and to operate print engine 204 during printing of an image onto a sheet of media. Print engine 204 may include any of a variety of different types of printing mechanisms including dye-sublimation, dot-matrix, ink jet or laser printing. For ease of description, print engine 204 may be an inkjet printing device although such description should not be considered limiting. Print engine 204 may include a carriage (not shown) for holding at least one print cartridge 212. According to an example embodiment, two print cartridges 212 may be utilized wherein, by way of example, a color cartridge is utilized for color printing and a black cartridge for monochrome printing. As one skilled in the art will recognize, the color cartridge may include three inks, i.e., cyan, magenta and yellow inks. Alternatively, a single black cartridge may be used.

In another alternative embodiment, one or more printheads (not shown) may be disposed in the movable carriage and one or more stationary ink tanks may be in fluid communication with the one or more printheads. In yet another alternative embodiment, at least one stationary printhead assembly is disposed substantially entirely across the media path of imaging device 100 and at least one ink tank may be in fluid communication with the printhead assembly, for providing page-wide printing.

Imaging device 100 may include a user interface 206, such as a graphical user interface, for receiving user input concerning operations performed or to be performed by imaging device 100, and for providing to the user information concerning same. The user interface 206 may include firmware maintained in memory 210 within housing 102 which may be performed by controller 202 or other processing element. In an example embodiment, the user interface 206 may include a display panel (not shown), which may be a touch screen display in which user input may be provided by the user touching or otherwise making contact with graphic user icons in the display panel. In one embodiment, the display panel may be disposed along the outer surface of lid 108 and sized for providing graphic images that allow for convenient communication of information between imaging device 100 and the user. Alternatively, input keys (not shown) may be provided to receive user input.

Figure 3:
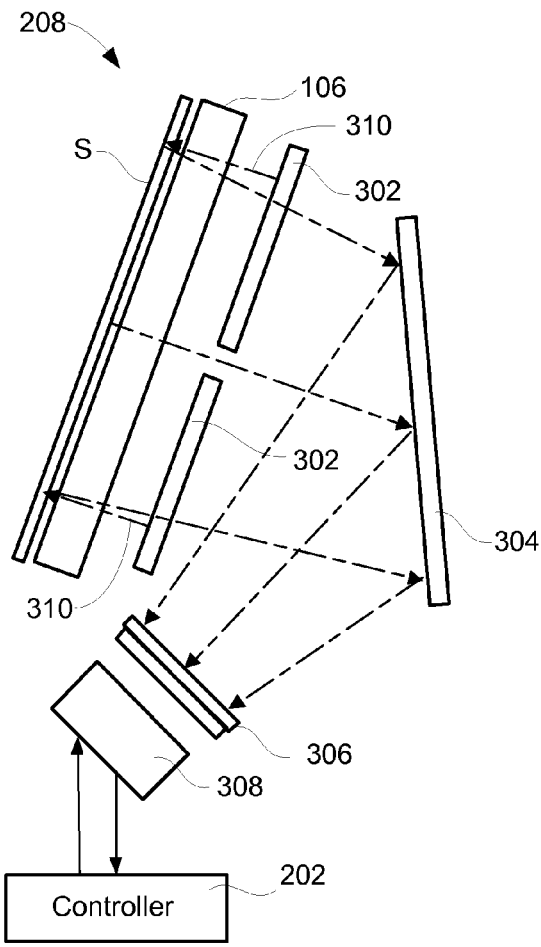
FIG. 3 is a side section view of a portion of the image capture unit in FIG. 2.
Figure 4:
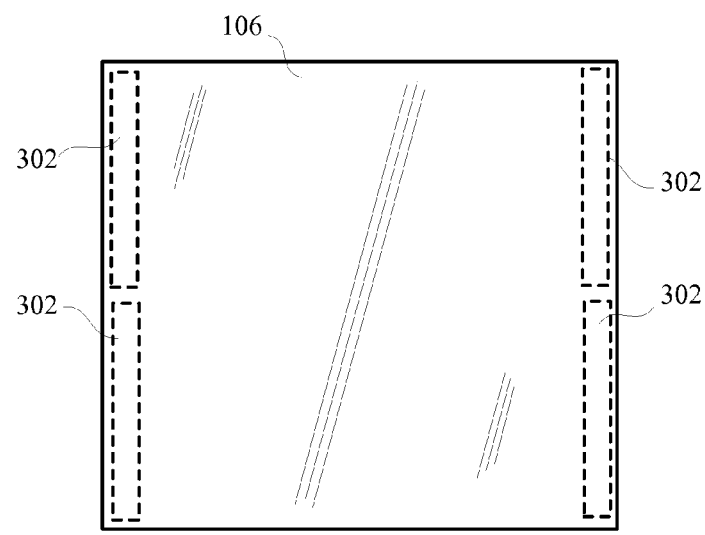
FIG. 4 is a front view of FIG. 3.

FIG. 3 illustrates a portion of the image capture unit 208 for capturing the image of a media sheet S placed against image capture window 106. One or more light assemblies 302 generate the light that is reflected from media sheet S for subsequent capture. A plurality of light assemblies 302 may be utilized in order to ensure that the media sheet S is substantially uniformly illuminated. Though FIG. 3 depicts light generated by each light assembly 302 as a single ray of light 310, it is understood that light assemblies 302 direct light along a relatively wide optical path. In an example embodiment, light assemblies 302 may be arranged about and in proximity with image capture window 106 so that a sufficient amount of light is directed towards media sheet S. FIG. 4 shows one arrangement of light assemblies 302 disposed behind image capture window 106 within housing 102. Each of the light assemblies 302 may include at least one light source, such as an LED. Alternatively, each of the light assemblies 302 may include at least one set of red, green and blue LEDs. Associated with each of the light assemblies 302 may include optics (not shown) for focusing and/or filtering light generated by the light assemblies 302.

With further reference to FIG. 3, a mirror 304 may be disposed behind image capture window 106 within housing 102. Mirror 304 is dimensioned and oriented for deflecting light reflected by media sheet S. A lens module 306 may be disposed in optical communication with mirror 304 so that light reflected by mirror 304 is focused by lens module 306 towards optical sensor array 308. Optical sensor array 308 may include a sufficient number of pixel elements for capturing at one time a substantially entire image of media sheet S. FIG. 3 shows the optical path 310 beginning with light generated by light assemblies 302 which is reflected by media sheet S and then deflected by mirror 304 so as to be incident on optical sensor array 308 following passage through lens module 306.

Controller 202 may be communicatively coupled to optical sensor array 308 and light assemblies 302 for controlling each during an image capture operation. In particular, controller 202 may control the activation of light assemblies 302 relative to the time period during which optical sensor array 308 captures light deflected from mirror 304.

Figure 5:
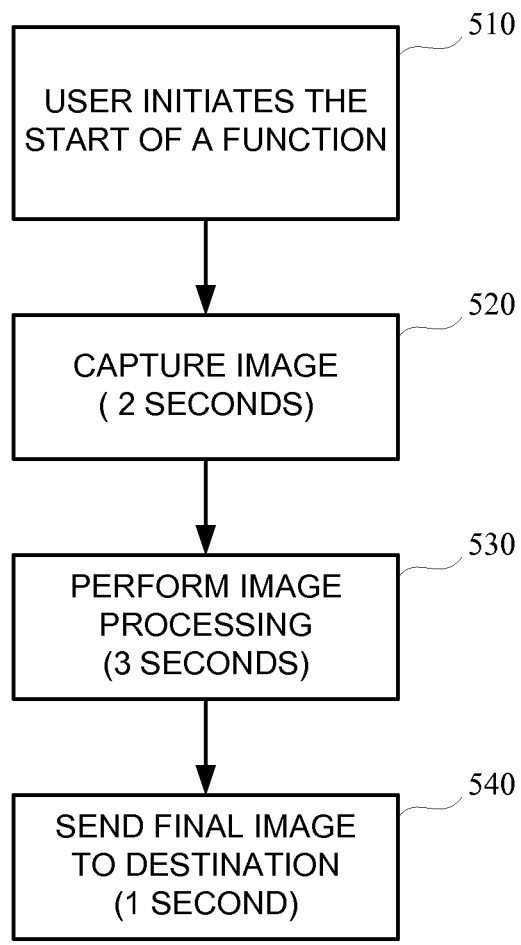
FIG. 5 is a flowchart illustrating a traditional method of performing a function utilizing an image capture operation.

FIG. 5 is a flowchart illustrating a traditional method of performing an imaging device function utilizing an image capture operation. Before the operation is started, a user first opens a scan lid, places an original against an imaging window, closes the scan lid and selects a desired function and associated options. Once the user initiates the selected function by pressing a start button or image (block 510), image on the media sheet is obtained (block 520) by an image capture unit. The captured image is then refined by means of image processing techniques (block 530) and sent to a final destination (block 540) requested by the user. The entire operation typically takes about 6 seconds to complete as shown by the accumulated time spent in blocks 520, 530, and 540 in FIG. 5. This traditional method, however, may be improved without increasing the performance of the hardware or introducing additional cost.

In accordance with example embodiment, controller 202 of imaging device 100 may operate in conjunction with image capture unit 208 to implement a method for reducing the time required to complete a function utilizing an image capture operation after a start request is received. Imaging device 100 may incorporate various functions implementing an image capture operation including, but not limited to, copying, scanning, and faxing. Each function may require a captured image to undergo image processing before being sent to a final destination. Moreover, the amount of time to complete a selected function may be reduced by immediately obtaining an image of a media sheet S placed in an image capture window 106 when it is determined that a lid 108 is in the closed position even if a desired function is not yet known or a start request is not yet received. In addition, image processing may be performed on the captured image prior to receiving the start request from the user. In this way, the idle period when a user is navigating the display panel to select a desired function and associated options is productively utilized. After the user initiates the start, fewer remaining acts may be performed by the imaging device 100 on the captured image thereby effectively reducing the time to complete a selected function after initiation.

According to an example embodiment, a closed lid 108 may be detected by utilizing the image capture unit 208 of imaging device 100. In one embodiment, image capture unit 208 may be a camera scan type wherein a substantially entire image of a media sheet S may be captured at one time. Since the image capture unit 208 is fixedly directed toward image capture window 106, the image capture window 106 may be substantially constantly monitored by image capture unit 208 for changes that may account for a closed lid. As a more specific example, optical sensors 308 may be utilized to detect an absence of light in the image capture window 106 with the light assemblies 302 turned off. This detection may, for example, include detecting changes in pixel lightness values of a captured image corresponding to a full plane of image capture window 106. Alternatively, movement of media sheet S on the window 106 may also be used as an indication of an open lid. Once the lid 108 is in the closed position, the image capture window 106 will darken almost completely and no further movement of media sheet S will be detected. Upon meeting at least one or both of these conditions, it can be ascertained that the lid 108 is in the closed position. Alternatively, it is contemplated that other sensing mechanisms, such as a lid sensor switch or the like, may be utilized for detecting an open or a closed lid.

Reference will now be made to the flowcharts of FIGS. 6-9 which show the detailed acts carried out by controller 202 of imaging device 100 to reduce the amount of time to complete a desired function after a user initiates its operation.

Figure 6:
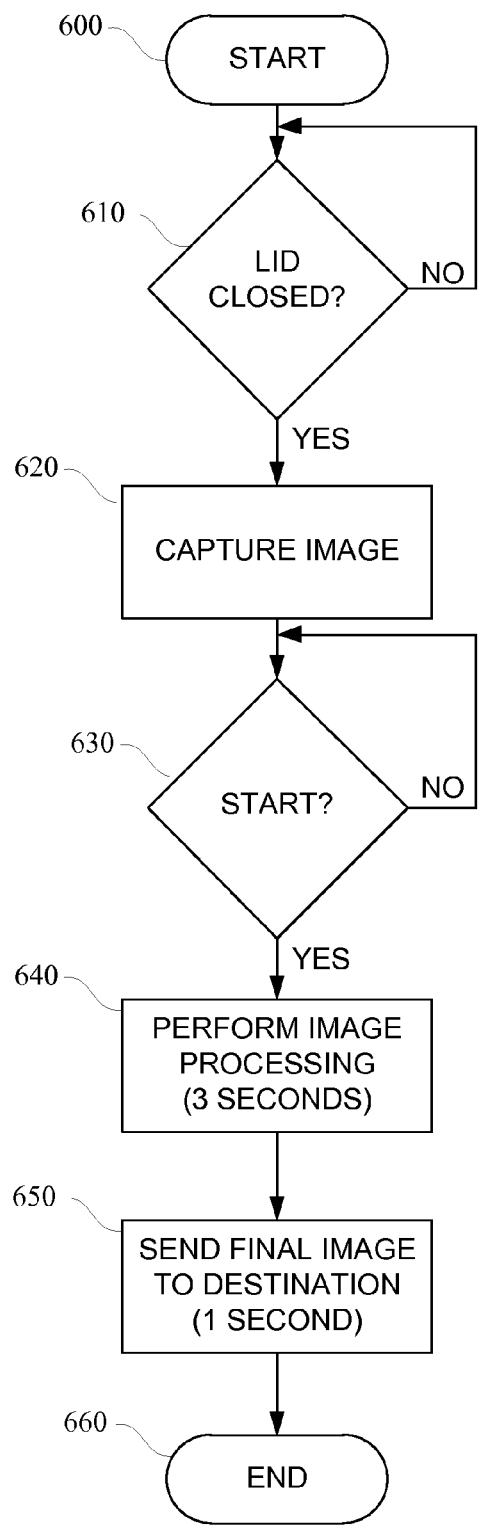
FIG. 6 is a flowchart illustrating a method that reduces time in completing an imaging function according to an example embodiment.

In FIG. 6, the start of the process is shown by numeral 600 where imaging device 100 is ready to accept a user request. In block 610, imaging device 100 may remain in a lid closure sensing condition when the lid is in the open position. Once the lid 108 is determined to be closed (block 610), an electrical signal indicative of a closed lid may be sent by the sensing mechanism monitoring the position of the lid 108 to controller 202. In response, controller 202 may instruct image capture unit 208 to obtain the image on the image capture window 106 (block 620). According to the example embodiment, controller 202 may activate light assemblies 302 and optical sensor array 308 in order to obtain the image at a default resolution. While the user navigates the user interface 206 to select a desired function, which may include, but is not limited to, scanning to copy, scanning to fax, scanning to file, scanning to e-mail, scanning to hard drive or scanning to memory card, imaging device 100 may then return to a non-operating state and remain idle until after the user initiates the start of operation associated with the selected function (block 630). In an example embodiment, a final image destination may be determined based on the selected function. Upon receiving a request from the user to start, controller 202 may process the captured image (block 640) to generate a final image based on the captured image and send the final image to its final destination requested by the user (block 650). In one embodiment, the final image processing may adjust the final image resolution to be in accordance with a user selected option. In comparison to the traditional method in FIG. 5, the amount of time spent to complete the selected function after receiving a start request from a user may be reduced from about 6 seconds to about 4 seconds.

Figure 7:
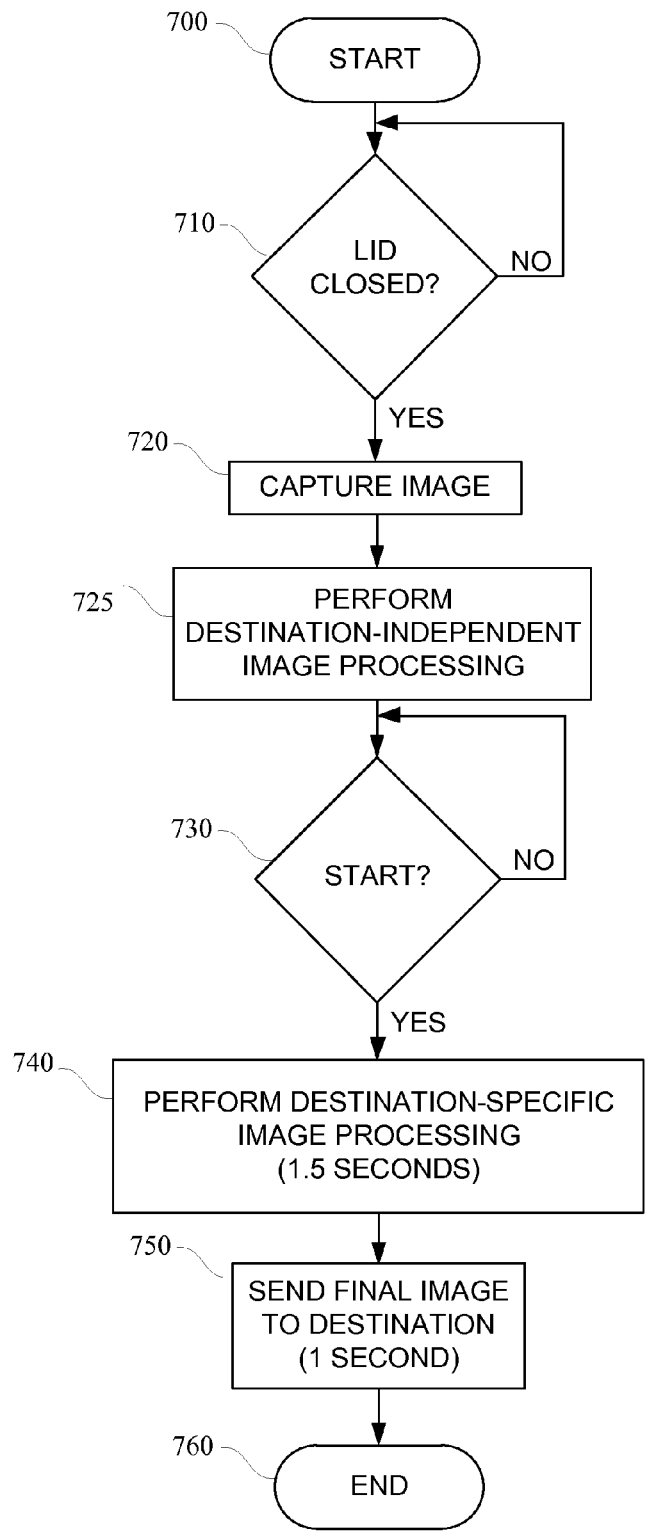
FIG. 7 is a flowchart illustrating a method that reduces time in completing an imaging function according to another example embodiment.

FIG. 7 shows a variation of the example embodiment shown in FIG. 6. Each function available in imaging device 100 may implement slightly different image processing techniques to optimize the image captured. In particular, each function may require a unique set of image processing depending on the final image destination to produce best imaging results. Since the example embodiment captures an image immediately after the lid is closed, the requested function and an associated final destination of the image is not yet known.

According to the example embodiment in FIG. 7, image on the image capture window 106 may be captured (block 720) upon detecting a closed lid (block 710). Further, controller 202 may initially perform destination-independent image processing operations on the captured image (block 725) prior to receiving a request from a user to start a selected function. Destination-independent image processing, for example, may include operations that are commonly performed for all image destinations such as bad pixel replacement, shading compensation and image distortion correction processing. On the other hand, destination-specific image processing (block 740) such as gamma correction, color correction, and sharpening, may not be performed until the final destination is determined, i.e., when the user has input a request to start the selected function (block 730). After the destination-specific image processing operations are performed (block 740), a final image based on the captured image may then be sent to the final destination (block 750). By initially performing required image processing operations after capturing the image and before receiving the start request, the completion time of a selected function after a start request may be further reduced from about 6 seconds in the traditional method to about 2.5 seconds.

In an alternative embodiment, controller 202 may perform both destination-independent and destination-specific image processing before a user initiates the start of a desired function in order to further reduce the completion time of a selected function after being initiated. In this method, an assumed final destination may be used to determine the destination-specific image processing operations to be initially performed. In one embodiment, the assumed destination may be fixed to imaging device 100 and permanently coded into firmware maintained, for example, in memory 210 of imaging device 100. The fixed destination assumption may be guided by market considerations and demographics. For example, if an imaging device is targeted for a home user, the assumed destination may be set to "copy" as a home user tends to scan to create copies more often whereas if an imaging device is targeted for business, the firmware may be programmed to set the assumed destination to "fax" as facsimile communication is more frequently used in business environments. In another example embodiment, the assumed destination may be made variable and changeable by the user according to preference. As an example, a user that typically scans to a memory card may select "memory card" as the assumed destination in the imaging device's operating menus. In yet another example embodiment, a smart destination assumption may be used to determine the assumed destination. This method monitors the recent usage of the imaging device and changes the destination assumption based on past functions. For example, frequently sending captured images to a hard drive of a host computer will automatically set the assumed destination to the "host computer."

Figure 8:
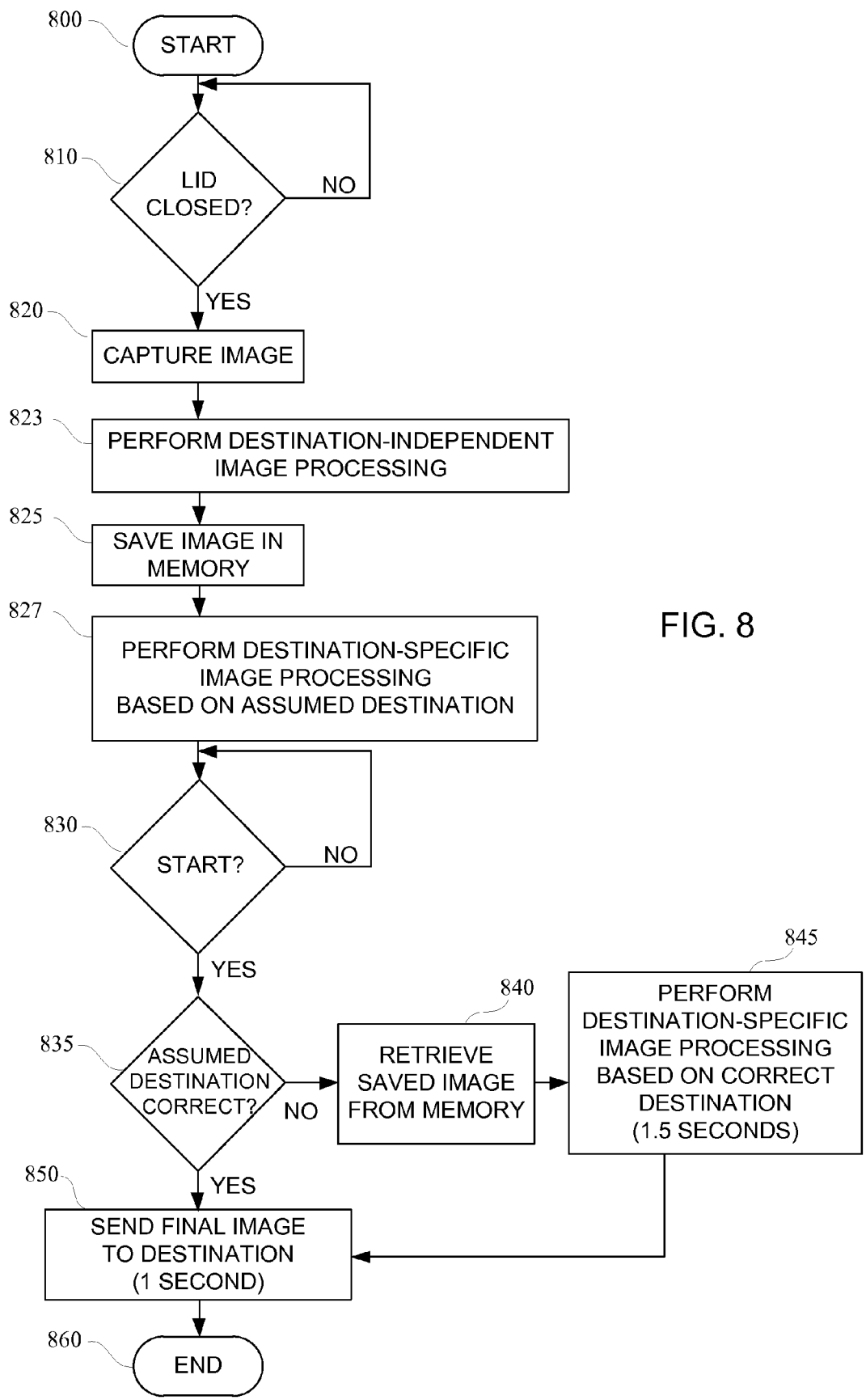
FIG. 8 is a flowchart illustrating a method that reduces time in completing an imaging function according to another example embodiment.

As shown in FIG. 8, once a lid is closed (block 810), the image may be captured (block 820) and destination-independent image processing may be performed on the captured image (block 823). Before performing destination-specific imaging processing for an assumed final destination (block 827), the resulting temporary processed image in block 823 may be stored in memory 210 (block 825) associated with controller 202. If the assumed final destination is determined to be correct (block 835), then image processing is complete and the final image is sent to its final destination (block 850). If the assumed destination does not correspond to the requested final destination, the resultant processed image from block 827 based on the assumed destination is discarded and the temporary processed image is retrieved from memory 210 (block 840). Thereafter, controller 202 may perform destination-specific image processing on the temporary processed image appropriate for the requested destination (block 845) to produce a final image and sends the final image to its destination (block 850). In the example embodiment, the time to complete a function after a user initiates its start is reduced for all image destinations and even further reduced for correct destination assumptions. As shown in FIG. 8, the optimization according to the present embodiment may reduce the time from about 6 seconds in the traditional method to about 1 second if the assumed destination assumption is correct and still about 2.5 seconds if the assumption is incorrect.

Figure 9:
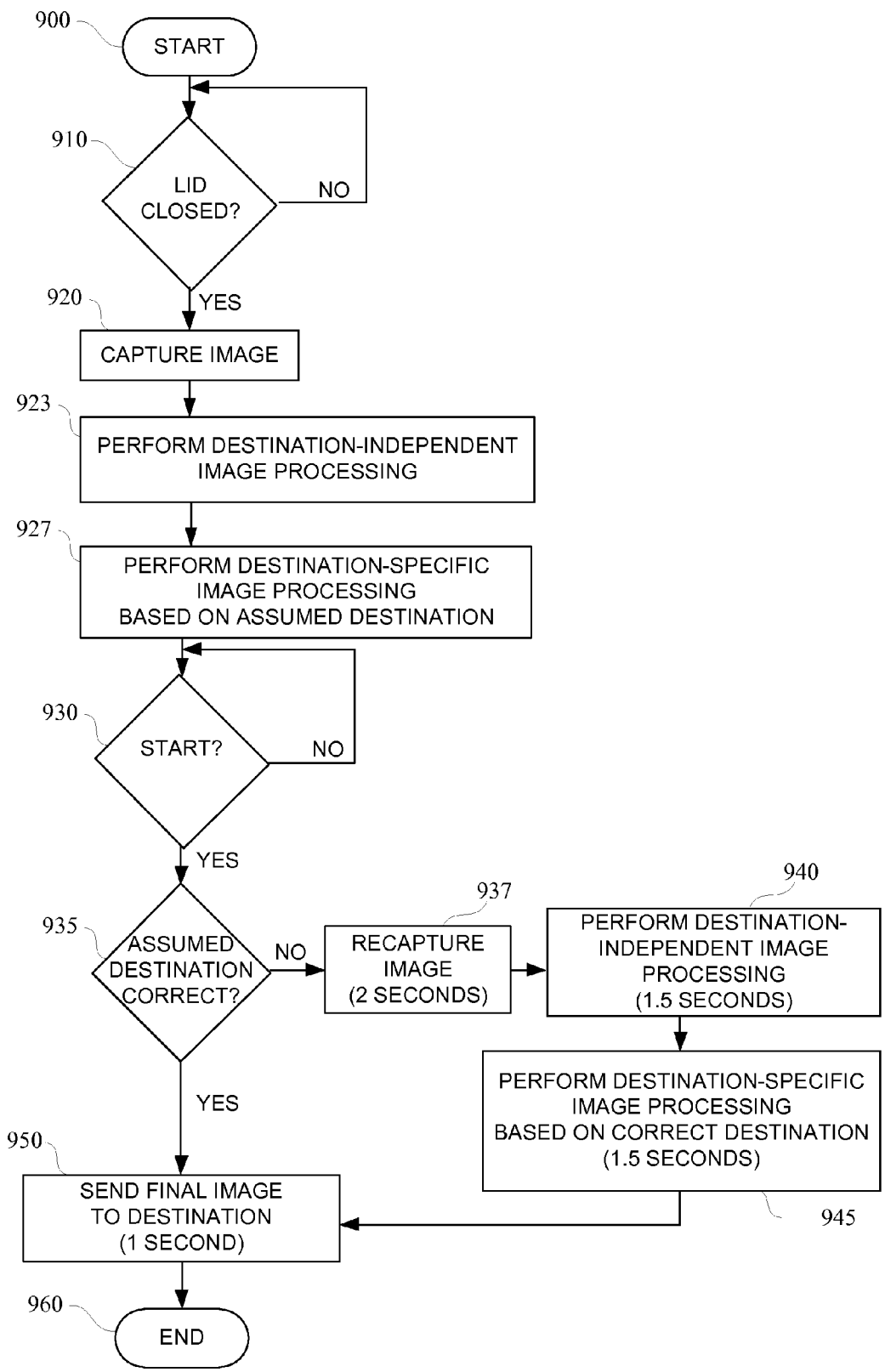
FIG. 9 is a flowchart illustrating a method that reduces time in completing an imaging function according to another example embodiment.

In an alternative embodiment shown in FIG. 9, memory space may be conserved by performing destination-specific image processing based on an assumed scan destination (block 927) immediately after the destination-independent image processing (block 923) without storing a temporary processed image from the destination-independent image processing. If the assumed final destination is correct (block 935), then image processing is complete and the final image is sent to the intended final destination (block 950). If the determination in block 935 is incorrect, i.e., the destination assumption does not correspond to the requested destination, then processing proceeds to block 937 where controller 202 may instruct image capture unit 208 to recapture the image on the image capture window 106. Thereafter, controller 202 may perform destination-independent image processing on the captured image (block 940) and destination-specific image processing appropriate for the correct destination (block 945). As a result, the completion time for a desired function is reduced for a correctly assumed destination. However, the present embodiment takes additional time to compensate for incorrect destination assumptions since the entire operation must be restarted. As shown in FIG. 9, the optimization according to the present embodiment may reduce the time to complete a function from about 6 seconds in the traditional method to about 1 second if the scan destination assumption is correct but remains about 6 seconds if the assumption is incorrect due to the reduced memory requirement.

As will be recognized by those skilled in the art, the image capture operations presented herein are easily applicable to any imaging and/or printing devices such as color and black-and-white copiers, color and black-and-white printers, and so-called "all-in-one devices" that incorporate multiple functions such as scanning, copying, and printing capabilities in one device without departing from the scope of the present invention.

The foregoing description of several methods and embodiments has been presented for purposes of illustration. It is not intended to be exhaustive or to limit the invention to the precise acts and/or forms disclosed, and obviously many modifications and variations are possible in light of the above teaching. It is intended that the scope of the invention be defined by the claims appended hereto.

What is claimed is:

1. A method of performing an image capture operation by an imaging device, the method comprising:
   receiving at least one media sheet against an image capture window of the imaging device;
   detecting whether a lid for covering the image capture window is closed;
   capturing an image of the at least one media sheet in the image capture window in response to detecting a closed lid;
   receiving a start signal indicative of a user request to start an image capture operation after capturing the image; and
   sending a final image based upon the captured image to a destination.

2. The method of claim 1, further comprising performing one or more image processing operations on the captured image after receiving the start signal in order to produce the final image.

3. The method of claim 1, further comprising:
   performing a first set of one or more image processing operations on the captured image before receiving the start signal to produce a processed image; and
   performing a second set of one or more image processing operations on the processed image after receiving the start signal to produce the final image.

4. The method of claim 3, wherein the first set of one or more image processing operations includes image processing operations that are independent of the destination and the second set of one or more image processing operations includes image processing operations that are dependent on the destination, and wherein the destination is received upon receiving the start signal.

5. The method of claim 1, further comprising:
   performing a first set of one or more image processing operations on the captured image to produce a first processed image; and performing a second set of one or more image processing operations on the first processed image before receiving the start signal to produce a second processed image, wherein the first set of one or more image processing operations includes image processing operations that are independent of the destination and the second set of one or more image processing operations includes image processing operations that are dependent on an assumed destination.

6. The method of claim 5, further comprising;

receiving the destination upon receiving the start signal;

determining whether the destination corresponds to the assumed destination; and upon determining that the destination corresponds to the assumed destination, assigning the second processed image as the final image.

7. The method of claim 6, further comprising:

storing the first processed image in memory before performing the second set of one or more image processing operations; and upon determining that the destination does not correspond to the assumed destination:

discarding the second processed image;

retrieving the first processed image from the memory; and performing a third set of one or more image processing operations that is dependent on the destination on the first processed image to produce the final image.

8. The method of claim 6, further comprising:

upon determining that the destination does not correspond to the assumed destination:

discarding the second processed image;

recapturing the image of the at least one media sheet in the image capture window;

performing the first set of one or more image processing operations on the recaptured image to produce a third processed image; and performing a third set of one or more image processing operations that is dependent on the destination on the third processed image to produce the final image.

9. The method of claim 5, wherein the assumed destination is fixed, adjustable by a user, or dependent on past image capture operations.

10. The method of claim 1, wherein the detecting whether the lid is closed includes:

sensing an absence of light in the image capture window.

11. The method of claim 1, wherein the detecting whether the lid is closed includes sensing movement of the at least one media sheet in the image capture window.

12. An imaging device, comprising:

an image capture window;

a lid attached to the imaging device for covering the image capture window when closed;

a controller for determining whether the lid is closed; and an image capture unit for capturing an image of at least one media sheet in the image capture window if the lid is determined to be closed;

wherein the controller receives a start signal indicative of a user request to start an image capture operation after the image capture unit captures the image and, in response, sends a final image based upon the captured image to a destination.

13. The imaging device of claim 12, wherein the controller is further configured to:

perform a first set of one or more image processing operations on the captured image before receiving the start signal to produce a processed image; and perform a second set of one or more image processing operations on the processed image after receiving the start signal to produce the final image.

14. The imaging device of claim 13, wherein the first set of one or more image processing operations includes image processing operations that are independent of the destination and the second set of one or more image processing operations includes image processing operations that are dependent on the destination.

15. The imaging device of claim 12, wherein the controller is further configured to:

perform a first set of one or more image processing operations on the captured image to produce a first processed image; and perform a second set of one or more image processing operations on the first processed image before receiving the start signal to produce a second processed image;

wherein the first set of one or more image processing operations includes image processing operations that are independent of the destination and the second set of one or more image processing operations includes image processing operations that are dependent on an assumed destination.

16. The imaging device of claim 15, wherein the controller is further configured to:

receive the destination upon receiving the start signal;

determine whether the destination corresponds to the assumed destination; and upon determining that the destination corresponds to the assumed destination, assign the second processed image as the final image.

17. The imaging device of claim 16, further comprising a memory, wherein the controller is further configured to:

store the first processed image in the memory before performing the second set of one or more image processing operations; and upon determining that the destination does not correspond to the assumed destination:

discard the second processed image;

retrieve the first processed image from the memory; and perform a third set of one or more image processing operations that is dependent on the destination on the first processed image to produce the final image.

18. The imaging device of claim 16, wherein the controller is further configured to:

upon determining that the destination does not correspond to the assumed destination:

discard the second processed image;

recapture the image of the at least one media sheet in the image capture window;

perform the first set of one or more image processing operations on the recaptured image to produce a third processed image; and perform a third set of one or more image processing operations that is dependent on the destination on the third processed image to produce the final image.

19. The imaging device of claim 15, wherein the assumed destination is fixed, adjustable by a user, or dependent on past image capture operations.

20. The imaging device of claim 12, wherein the image capture unit senses an absence of light in the image capture window in order for the controller to determine if the lid is closed.

21. The imaging device of claim 12, wherein the controller further performs one or more image processing operations on the captured image after receiving the start signal in order to produce the final image.

22. The imaging device of claim 12, wherein the image capture unit senses movement of the at least one media sheet in the image capture window in order for the controller to determine if the lid is closed.

23. The imaging device of claim 12, wherein the image capture unit includes one or more light assemblies for illuminating the at least one media sheet on the image capture window during the image capture operation, the one or more light assemblies being turned off when the controller determines whether the lid is closed.

* * * * *